May 4, 1965 R. R. McHENRY 3,181,877
CLOSED HYDRAULIC LEVELING SYSTEM FOR MOTOR VEHICLE
Filed March 1, 1962 2 Sheets-Sheet 1

RAYMOND R. McHENRY
INVENTOR

BY John R. Faulkner
Clifford L. Sadler

ATTORNEYS

United States Patent Office 3,181,877
Patented May 4, 1965

3,181,877
CLOSED HYDRAULIC LEVELING SYSTEM
FOR MOTOR VEHICLE
Raymond R. McHenry, West Seneca, N.Y., assignor to
Ford Motor Company, Dearborn, Mich., a corporation
of Delaware
Filed Mar. 1, 1962, Ser. No. 176,720
13 Claims. (Cl. 280—6)

This invention relates generally to motor vehicles, and particularly to a closed hydraulic leveling system for a motor vehicle.

This application is a continuation-in-part of my copending application Serial Number 23,758, filed April 21, 1960, now abandoned.

An object of the present invention is to provide a motor vehicle hydraulic leveling system of the closed type automatically maintaining a predetermined relationship between the vehicle chassis and the road wheels regardless of the load on the vehicle.

A further object of the invention is to provide a closed hydraulic leveling system incorporating hydraulic cylinders associated with sprung and unsprung members of the vehicle adapted to change the relationship between said members to adjust the riding height of the vehicle when fluid is supplied thereto or exhausted therefrom, in combination with a hydraulic accumulator, an electric driven hydraulic pump, conduits connecting the cylinder, accumulator and pump, and an electric control circuit responsive to the variations in the relationship between the sprung and unsprung members of the vehicle to effect the necessary variation in the riding height of the vehicle. When the vehicle riding height is too high the electrical control circuit automatically starts the electric motor to drive the hydraulic pump and exhaust fluid from the cylinder to the accumulator. When the riding height is too low the electrical control circuit automatically opens a solenoid operated valve to supply the cylinder with fluid from the accumulator.

A still further object of the invention is to provide a closed hydraulic leveling system for a motor vehicle providing independent leveling for different portions of the vehicle while utilizing a single pump and simplified hydraulic connections and electrical control circuitry.

Another object is to provide a closed hydraulic leveling system in which the hydraulic pump need be operated only when exhausting of the hydraulic cylinders is required and in which the supply of fluid to the hydraulic cylinders is accomplished by means of a hydraulic accumulator automatically charged by the pump during the exhaust cycle period.

Other objects and advantages of this invention will become more apparent as this description proceeds, particularly when considered in connection with the accompanying drawings, in which.

Figure 1:
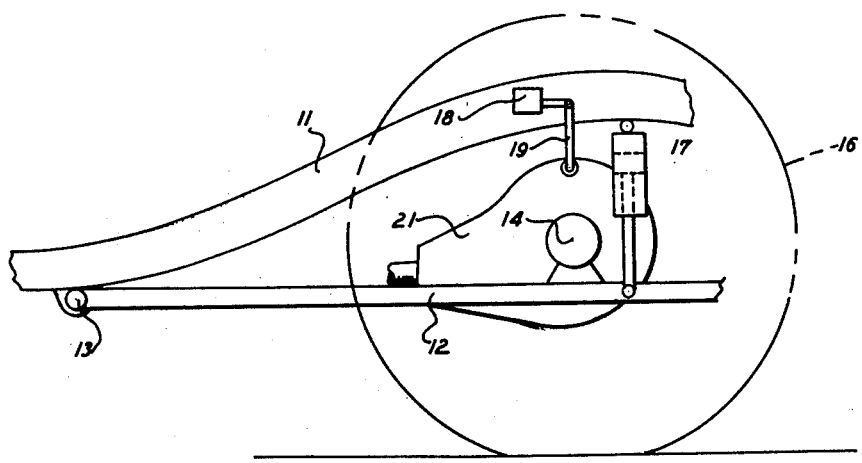
FIGURE 1 is a semi-diagrammatic side elevational view of a portion of a motor vehicle chassis incorporating the present leveling system.

Referring now to the drawings, and particularly to FIGURE 1, the reference character 11 indicates the side frame rail of a motor vehicle chassis. A trailing arm 12 is pivotally connected to the frame rail at 13, and at its rearward end supports a rear axle 14 conventionally carrying rear road wheels 16.

Figure 2:
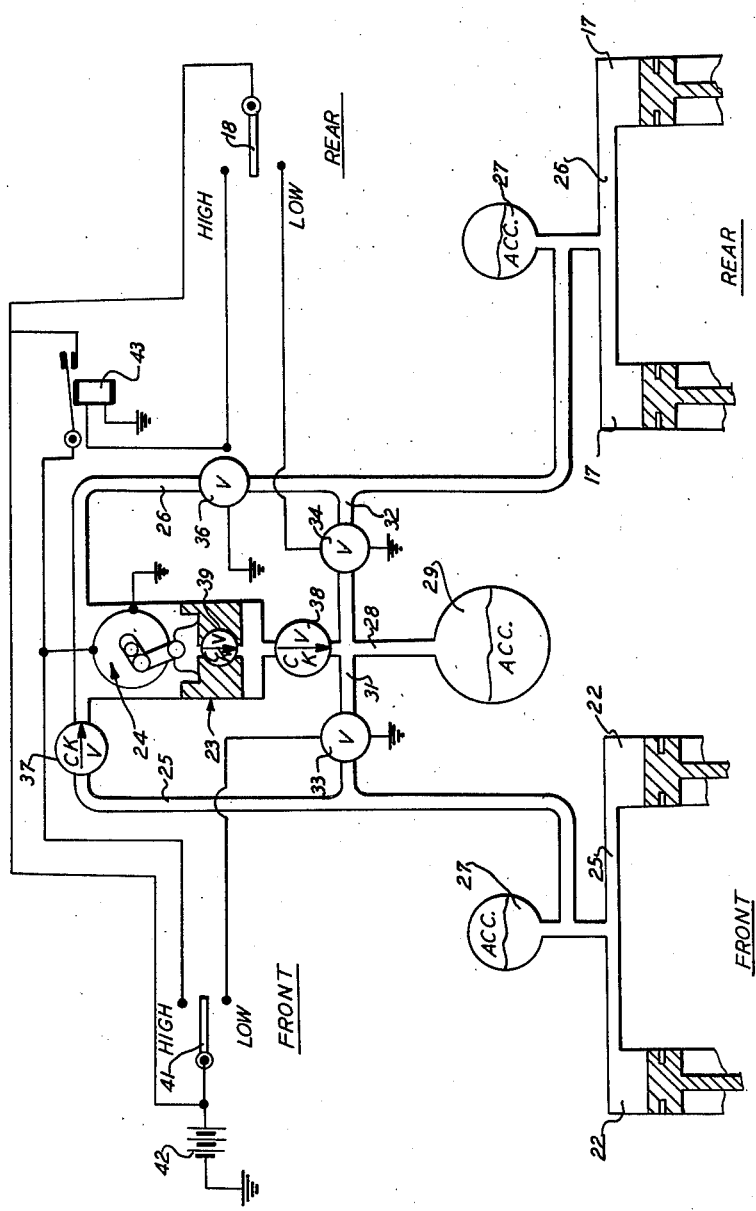
FIGURE 2 is a diagram of the hydraulic and electrical circuit.

Although the present invention is applicable to various types of suspensions, FIGURES 1 and 2 illustrate the invention as applied to a hydropneumatic type of suspension in which a hydropneumatic cylinder assembly 17 is interconnected between the vehicle frame rail 11 and the trailing arm 12 of the wheel suspension. The hydropneumatic unit 17, which is thus connected between sprung and unsprung portions of the vehicle, is conventional in construction and not only provides a spring suspension for the vehicle but also enables adjustments to be made in the relationship between the sprung and unsprung portions of the vehicle to change the riding height of the vehicle. This may readily be accomplished by supplying fluid to the hydropneumatic suspension unit 17 or by exhausting fluid therefrom as required.

Still referring to FIGURE 1, it will be seen that an electrical control switch 18 is mounted upon the side frame rail 11 and is connected by linkage 19 to the differential carrier 21 of the rear axle assembly. The control switch 18 is thus responsive to variations in the relationship between the vehicle frame and the rear road wheels.

Reference is now made to FIGURE 2 which illustrates in diagrammatic form the hydraulic and electrical control system of the present invention. Although the system is applicable to various arrangements of vehicle control, it is shown here as providing independent leveling control for the front and rear wheels of the vehicle. As previously discussed, a pair of hydropneumatic suspension units 17 are associated with the rear road wheels. A similar pair of hydropneumatic suspension units 22 are associated with the front road wheels and are suitably connected between sprung and unsprung members of the front wheel suspension systems.

The hydraulic circuit includes a hydraulic pump 23 driven by an electric motor 24 and connected to the front hydropneumatic suspension units 22 by means of a conduit 25 and to the rear hydropneumatic suspension unit 17 by means of a conduit 26. An accumulator 27 is connected to each conduit 25 and 26. The high pressure side of the hydraulic pump 23 is connected by means of a conduit 28 to an accumulator 29. The accumulator 29 is connected to the conduit 25 of the front hydropneumatic suspension unit 22 by means of a conduit 31, and to the conduit 26 of the rear hydropneumatic suspension unit 17 by means of a conduit 32.

Normally closed solenoid operated hydraulic valves 33, 34 and 36 are positioned in the conduits 31, 32 and 26 respectively. Check valves 37 and 38 are positioned in the conduits 25 and 28 respectively and a third check valve 39 is positioned in the piston of the hydraulic pump 23.

The electrical circuit includes a control switch 18 for the rear wheel suspension adapted to be responsive to variations between the sprung and unsprung portions of the rear suspension, as shown in FIGURE 1. A similar control switch 41 is provided for the front wheel suspension and is similarly connected between sprung and unsprung portions thereof to be responsive to variations in the relationship therebetween.

Each control switch 18 and 41 has a pair of contact points marked "High" and "Low" on the diagram of FIGURE 2. The arrangement is such that contact is made with the contact point marked "High" when the vehicle riding height is too high and with the contact point marked "Low" when the vehicle riding height is too low.

The electrical circuit also includes a power source in the form of a battery 42 and a starting relay 43. Relay 43 isolates rear switch 18 and solenoid valve 36 from the front switch 41.

*Leveling operation—Front wheels*

The present system operates to provide independent leveling for the front and rear road wheels. That for the front road wheels will now be described.

When the vehicle is operating at its normal riding height control switch 41 will be open and the leveling system inoperative. At this time the hydropneumatic suspension units 22 for the front road wheels will perform their normal spring function. When the load on the vehicle is increased by the ingress of passengers or the addition of luggage, the vehicle riding height will be lowered causing electric control switch 41 to close the contact point marked "Low" to complete an electrical circuit to the normally closed solenoid operated valve 33. When thus energized the valve 33 opens to provide communication from the hydraulic accumulator 29 to the front hydropneumatic suspension units 22 through the conduits 28, 31 and 25. This supplies additional fluid to the front hydropneumatic suspension units 22 and returns the vehicle to its normal riding height, at which time control switch 41 opens to maintain the vehicle in that position.

When the riding height of the vehicle is increased above its normal position, due to the egress of passengers or the removal of luggage, electric switch 41 engages the contact point marked "High" and completes an electric circuit to the motor 24, starting the latter and operating the hydraulic pump 23. Operation of the pump 23 pumps fluid from the front hydropneumatic suspension units 22 through conduit 25 and check valve 37 to the low pressure side of the pump, and thence through check valves 39 and 38 and conduit 28 to the hydraulic accumulator 29. This removal of fluid from the front hydropneumatic suspension units 22 lowers the vehicle height to its predetermined normal position at which time switch 41 opens to hold the vehicle in that position. It will be noted that this operation, in addition to removing fluid from the front hydropneumatic suspension units, charges the accumulator 29. A closed system is thus provided in which the pump need only be operated intermittently and then against differential pressure rather than a maximum system pressure. Power requirements and pump costs are thus minimized.

*Leveling operation—Rear wheels*

It will be noted that during the front wheel leveling operation described above, the closed solenoid operated valves 34 and 36 isolate the rear hydropneumatic suspension units 17. During rear wheel leveling these valves are adapted to be selectively opened and at this time the front wheel leveling suspension is isolated by means of the closed solenoid operated valves 33 and check valve 37.

Electric control switch 18 senses variations in the relationship between sprung and unsprung members of the rear wheel suspension system. When the rearward portion of the vehicle is too low, switch 18 closes a circuit to the solenoid operated valve 34 to open this valve and connect accumulator 29 to the hydropneumatic suspension units 17 for the rear wheels by means of conduits 28, 32 and 26. When the riding height of the rearward portion of the vehicle is too high, control switch 18 completes a circuit to the electric motor 24 for driving the hydraulic pump 23 by closing the starting relay 43. At the same time solenoid operated valve 36 is opened to permit fluid flow from the rear hydropneumatic suspension units 17 to the inlet of the pump 24. The outlet of the pump supplies pressure fluid to the accumulator 29.

It will be seen that the front and rear suspension systems are independently leveled by means of a simplified closed hydraulic circuit utilizing a single pump.

The system is designed so that the pressure within hydropneumatic suspension units 17 is always greater than the pressure in units 22 for all load conditions. This assures that check valve 37 will be closed to isolate the front side of the system even during operation of the pump 23 to reduce the pressure and fluid volume in units 17.

This pressure differential between the front and rear portions of the system is achieved by appropriate design of the areas within the units 17 and 22 and the leverage or mechanical advantage through which they operate to support the sprung mass.

Figure 3:
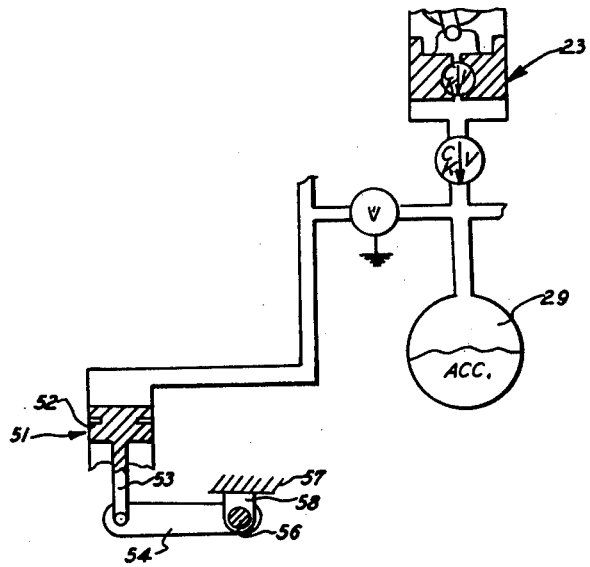
FIGURE 3 is a fragmentary diagram similar to a portion of FIGURE 2, but showing a modification.

Although the present closed leveling system is shown in conjunction with a suspension system of the hydropneumatic type, the leveling system is applicable to other types of systems as well. FIGURE 3 illustrates a portion of one such modification. In FIGURE 3 a hydraulic servo cylinder and piston assembly 51 is shown in place of the hydropneumatic suspension units 17 and 22 of FIGURE 2. The hydraulic and electrical circuit for controlling and actuating servo 51 is identical to that of the FIGURE 2 embodiment.

The piston 52 of the servo assembly is connected by a piston rod 53 to an arm 54 nonrotatably connected to a torsion bar 56 adjacent the anchored end of the latter. The torsion bar 56 is shown as mounted upon a frame member 57 by means of a supporting bracket 58. The opposite end of the torsion bar 56 is suitably connected to a conventional suspension member in any desired fashion to provide spring means for the road wheel carried by that suspension member.

It will be seen that rotation of the arm 54 adjusts the angular position of the anchored end of the torsion bar 56 and consequently is effective to change the riding height of the vehicle. This angular adjustment of the torsion bar is effected by means of the servo unit 51 which is supplied with fluid from the accumulator 29 in the same manner as shown in FIGURE 2 and is likewise adapted to be exhausted by means of operation of the hydraulic pump 23.

When the vehicle riding height is too low the servo unit 51 is supplied with fluid under pressure from the accumulator to adjust the torsion bar 56 to raise the vehicle riding height. Conversely, when the vehicle riding height is too high the pump 23 is operated to pump fluid from the hydraulic servo unit to the accumulator and to thus adjust the torsion bar anchor in the opposite direction to lower the vehicle riding height.

The foregoing description constitutes the preferred embodiment of the present invention. It is to be understood, however, that possible modifications and alternate arrangements may occur to those skilled in the art which will come within the scope and spirit of the appended claims.

What is claimed as new is:

1. A suspension system for a motor vehicle having sprung and unsprung components, first and second fluid controlled suspension means interconnecting said components, said suspension means having spring means adapted for the resilient support of said sprung components upon said unsprung components, fluid control means adapted to control the loading of said suspension means responsive to the spacing of said sprung and unsprung components, said control means including a high pressure fluid source, a low pressure fluid source, and fluid passage means providing communication between said suspension means and said sources, pressurized fluid in said suspension means, the fluid in said first suspension means being under a greater pressure than the fluid in said second suspension means during both dynamic and static conditions, said control means also including valve means interposed in said fluid passage means between said first suspension means and said second suspension means and constructed to isolate said suspension means one from the other, said valve means including a check valve means responsive to the pressure differential between said first and said second suspension means.

2. The combination of claim 1 wherein said spring means includes a pneumatic spring device.

3. The combination of claim 1 wherein said spring means includes a metallic spring device.

4. The combination of claim 1 wherein said spring means includes a torsion spring device.

5. A suspension system for a motor vehicle and having sprung and unsprung components, first and second fluid controlled suspension means interconnecting said components, said suspension means having spring means adapted for the resilient support of said sprung components upon said unsprung components, a common pressure increasing and pressure reducing means, first and second fluid circuit means connecting said first and second fluid controlled suspension means respectively with said common pressure increasing and pressure reducing means, pressurized fluid in said suspension means and said fluid circuit means, the fluid in said second suspension means and said second fluid circuit means being under a greater static fluid pressure than the fluid in said first suspension means and said first fluid circuit means when said vehicle is in its designed attitude, one of said fluid circuit means having a control valve and the other fluid circuit means having a differential pressure responsive one-way flow check valve, means including said valves adapted to isolate said first and second suspension means from each other and to control communication through said fluid circuit means between said suspension means and said pressure means.

6. The combination of claim 5 wherein said spring means includes a pneumatic spring device.

7. The combination of claim 5 wherein said spring means includes a metallic spring device.

8. The combination of claim 5 wherein said spring means includes a torsion spring device.

9. A suspension system for a motor vehicle and having sprung and unsprung components, first and second fluid controlled suspension means interconnecting said components, said suspension means having spring means adapted for the resilient support of said sprung components upon said unsprung components, a pump, an electrical motor for driving said pump, an accumulator connected to the output of said pump, first and second fluid circuit means connecting said first and second fluid controlled suspension means respectively with the inlet of said pump and with the outlet of said accumulator, pressurized fluid in said suspension means and said fluid circuit means, the fluid in said second suspension means and said second fluid circuit means being under a greater static fluid pressure than the fluid in said first suspension means and said first fluid circuit means when said vehicle is in its designed attitude, said second fluid circuit means having a normally closed solenoid controlled valve and said first fluid circuit means having a differential pressure responsive one-way flow check valve, said valves constructed to isolate said first and second fluid circuit means from each other and to control communication through said fluid circuit means between said suspension means and the inlet of said pump, said motor and said solenoid valve being in parallel electrical circuitry and adapted to be actuated upon an increase in the spacing of said sprung and unsprung components.

10. The combination of claim 9 wherein said spring means includes a pneumatic spring device.

11. The combination of claim 9 wherein said spring means includes a metallic spring device.

12. The combination of claim 9 wherein said spring means includes a torsion spring device.

13. In a hydraulic leveling system for a motor vehicle having a sprung and an unsprung member, a hydraulic unit associated with said sprung and unsprung members and adapted to change the riding height of said vehicle when fluid is supplied thereto or exhausted therefrom, a hydraulic pump, an electric motor driving said pump, a hydraulic accumulator, a first conduit connecting said hydraulic unit with the intake side of said pump, a second conduit connecting the output side of said pump with said accumulator, a third conduit connecting said accumulator and said hydraulic unit, a normally closed solenoid operated hydraulic valve in said third conduit, and an electric control switch responsive to variations in the relationship between said sprung and unsprung members, said control switch closing an electric circuit to said electric motor when the vehicle riding height is too high to pump fluid from said hydraulic unit through said first and second conduits to said accumulator, and said control switch closing an electric circuit to said solenoid operated valve when the vehicle riding height is too low to supply fluid from said accumulator through said third conduit to said hydraulic unit, a normally closed solenoid operated hydraulic valve in said first conduit, said electric control switch being arranged in parallel circuitry with said motor to operate said last mentioned solenoid operated hydraulic valve to open the latter when the vehicle riding height is too high to provide communication through said first conduit from said hydraulic unit to said pump.

References Cited by the Examiner
UNITED STATES PATENTS

| | | |
|---|---|---|
| 820,707 | 5/06 | Downer. |
| 2,882,068 | 4/59 | Faiver. |
| 2,887,324 | 5/59 | Jackson. |
| 2,937,034 | 5/60 | Langen. |
| 2,939,722 | 6/60 | Dallas. |
| 2,976,054 | 3/61 | Sahagian. |
| 2,987,312 | 6/61 | Alliquant. |
| 3,021,153 | 2/62 | Dickinson. |

A. HARRY LEVY, *Primary Examiner.*

LEO FRIAGLIA, *Examiner.*